Figure 1:
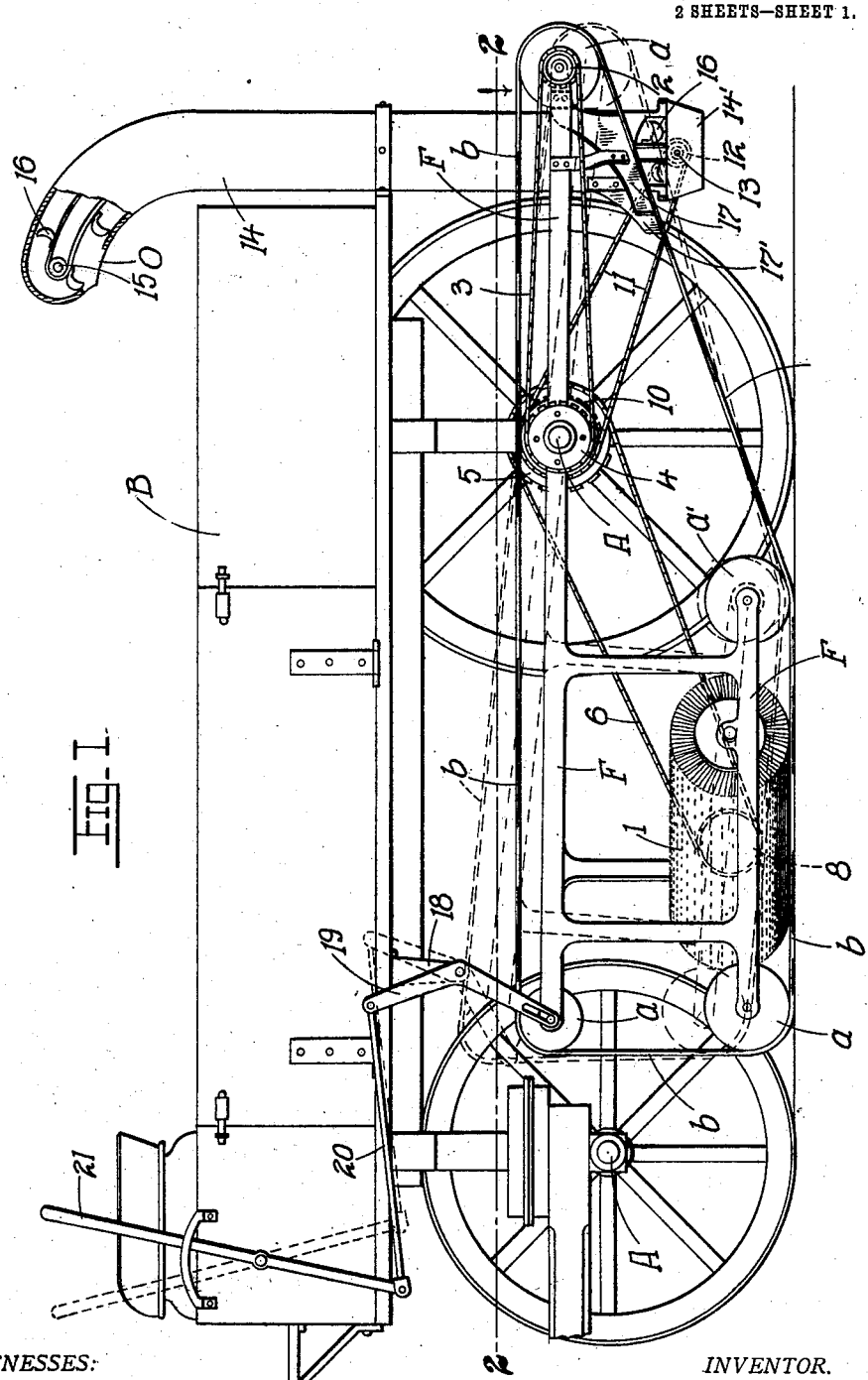

No. 889,797. PATENTED JUNE 2, 1908.
R. I. MADDEN.
STREET SWEEPER.
APPLICATION FILED SEPT. 21, 1907.

2 SHEETS—SHEET 1.

WITNESSES:

INVENTOR.
Richard I. Madden
BY
ATTORNEY.

No. 889,797. PATENTED JUNE 2, 1908.
R. I. MADDEN.
STREET SWEEPER.
APPLICATION FILED SEPT. 21, 1907.
2 SHEETS—SHEET 2.
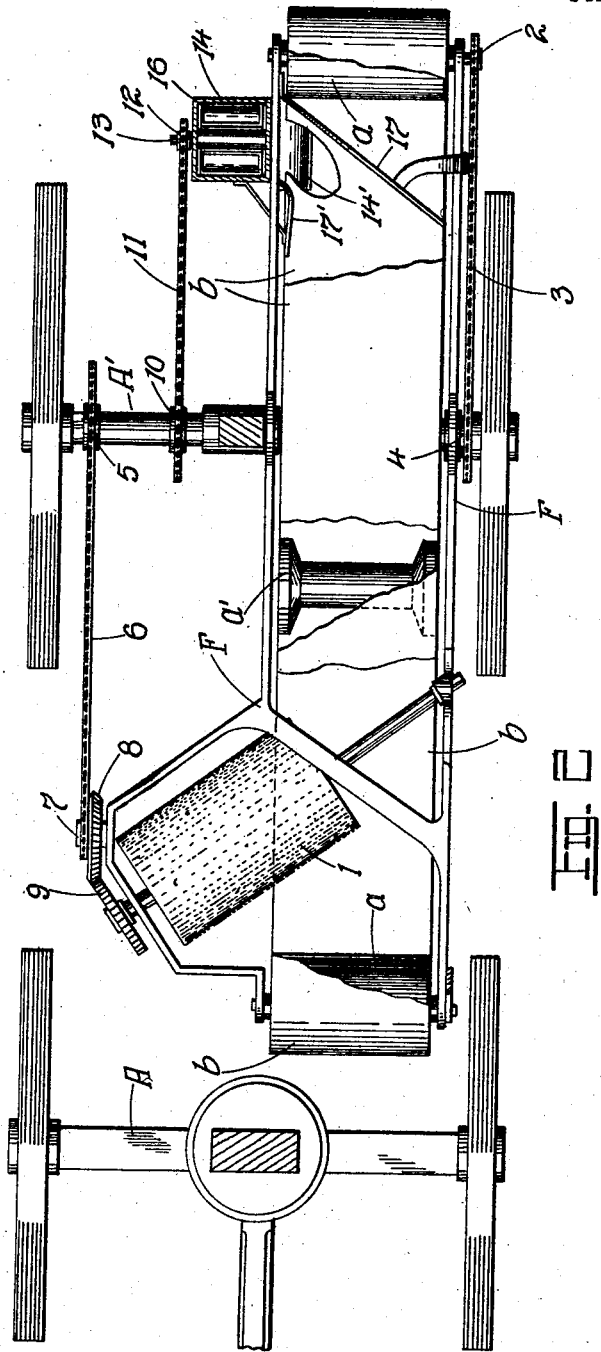
WITNESSES:
INVENTOR.
Richard I. Madden
BY
ATTORNEY.

UNITED STATES PATENT OFFICE.

RICHARD I. MADDEN, OF ST. LOUIS, MISSOURI.

STREET-SWEEPER.

No. 889,797.     Specification of Letters Patent.     Patented June 2, 1908.

Application filed September 21, 1907. Serial No. 393,919.

*To all whom it may concern:*

Be it known that I, RICHARD I. MADDEN, citizen of the United States, residing at St. Louis, State of Missouri, have invented certain new and useful Improvements in Street-Sweepers, of which the following is a full, clear, and exact description, reference being had to the accompanying drawings, forming a part hereof.

My invention has relation to improvements in street sweepers; and it consists in the novel construction and arrangement of parts more fully set forth in the specification and pointed out in the claims.

In the drawings, Figure 1 is a side elevation of the sweeper, and Fig. 2 is a horizontal section on the line 2—2 of Fig. 1.

The object of my invention is to construct a street sweeper which will automatically remove the dirt and convey the same to a box or receptacle mounted on the wagon frame to which the operating parts are secured, the material thus deposited in the box being either removed by shoveling, or mechanically dumped into an accompanying cart as the case may be, the manner of its disposition from the box not being specially concerned with the immediate invention forming the subject matter of the present application. The advantages of the invention will be better apparent from a detailed description thereof which is as follows:

Referring to the drawings, B, represents the wagon-body, A, A' respectively the axles of the front and rear trucks. Mounted loosely on, and adapted to oscillate in a vertical plane about the axis of the rear axle A', is a frame F of any suitable design, the same having mounted thereon at the base of the forward end thereof the cylindrical broom 1, the axis of the broom being inclined to the general length of the machine, and so positioned that it may sweep close to the curb of a street and direct the sweepings inwardly. The frame F is provided with idler pulleys $a$, $a$ $a'$ over which passes a belt-conveyer $b$, a section of the front end of the lower lap passing under the broom. The shaft of the rear pulley $a$ is provided with a sprocket wheel 2 from which leads a sprocket chain 3 to a similar sprocket wheel 4 secured to the axle A', a second sprocket wheel 5 on the said axle having a chain 6 leading to a sprocket wheel 7 on the spindle of a bevel gear wheel 8 meshing with a gear 9 on the broom-shaft. Secured also in proper position on the axle A' is a sprocket wheel 10 from which leads a chain 11 to the sprocket wheel 12 on the end of a shaft 13 at the bottom of a vertically disposed chute 14. At the end of the upper curved extension of the chute is a second shaft 15, and between the shafts 13 and 15 within the chute is disposed a bucket conveyer 16. Secured to the rear of the frame F and engaging the upper surface of the rear portion of the lower lap of the belt conveyer $b$ are scrapers 17, 17' which direct the dirt from the belt into the bottom receptacle 14' of the chute, from which receptacle the buckets of the conveyer 16 carry the dirt upward where it drops through the discharge opening O, into the box or wagon-body B. So that the dirt may get by the pulley $a'$, the latter is made spool-shaped or with a longitudinally concave periphery, the dirt passing between the belt and said periphery (Fig. 2).

Pivoted to a bracket 18 is a bell-crank 19 one arm having coupled thereto one end of a link 20 whose opposite end is controlled by a lever 21. The slotted end of the opposite arm of the bell-crank is coupled to the oscillating frame F, and, as seen by the dotted position of the parts Fig. 1 the broom and belt-conveyer may be picked off the ground when desirable.

It will be seen from the foregoing that as the machine is drawn over the ground, the wheels of the rear axle impart motion thereto, and this is in turn communicated to the broom and belt and bucket conveyers, the dirt dropping into the wagon-body.

Features illustrated but not described are well known and therefore are not herein specifically referred to.

Having described my invention, what I claim is:

1. In a street sweeper, a wagon body, a broom automatically rotated against the surface passed over by the travel of the wagon, an endless conveyer positioned to receive the sweepings from the broom, a chute, a scraper for directing the sweepings from the conveyer into said chute, and means for delivering the material from the chute into the body, substantially as set forth.

2. In a street sweeper, a wagon body, a broom automatically rotated against the surface passed over by the travel of the wagon, an endless conveyer positioned to receive the sweepings from the broom and normally traveling along the surface swept by the broom, means for disengaging the conveyer from the surface passed over, a chute, a scraper for directing the sweepings from the conveyer into said chute, and means for delivering the material from the chute into the wagon-body, substantially as set forth.

3. In a street sweeper, a wagon-body, a broom automatically rotated against the surface passed over by the travel of the wagon, a vertically oscillating frame coupled to the rear truck of the wagon, an endless belt conveyer mounted on said frame and having a section of its lower lap passing under the broom, the latter being mounted on the oscillating frame, suitable gearing for actuating said broom and belt-conveyer from the axle of the rear truck, a scraper engaging the lower lap of the belt-conveyer at a point beyond the broom, a chute for receiving the dirt removed by the scraper, a bucket conveyer in the chute for directing the material into the wagon-body, a series of idlers or pulleys for the belt-conveyer, the pulley adjacent to the scraper being spool-shaped to allow the dirt to pass onward to the scraper, substantially as set forth.

In testimony whereof I affix my signature, in presence of two witnesses.

RICHARD I. MADDEN.

Witnesses:
W. C. KILLEEN,
H. T. MOEHLE.